United States Patent
Chandrasekaran et al.

(10) Patent No.: US 10,078,618 B2
(45) Date of Patent: Sep. 18, 2018

(54) ACCESSING SHARED CONTENT USING COLLABORATION ATTRIBUTE PARTITIONING

(71) Applicant: Box, Inc., Los Altos, CA (US)

(72) Inventors: Venkat Chandrasekaran, Pleasanton, CA (US); Roger Huang, San Mateo, CA (US); Tamar Bercovici, San Francisco, CA (US); Vikram Sardesai, San Jose, CA (US)

(73) Assignee: Box, Inc., Redwood City, CA (US)

( * ) Notice: Subject to any disclaimer, the term of this patent is extended or adjusted under 35 U.S.C. 154(b) by 285 days.

(21) Appl. No.: 14/952,702

(22) Filed: Nov. 25, 2015

(65) Prior Publication Data

US 2017/0147527 A1 May 25, 2017

(51) Int. Cl.
*G06F 15/167* (2006.01)
*H04L 29/08* (2006.01)

(52) U.S. Cl.
CPC .......... *G06F 15/167* (2013.01); *H04L 67/02* (2013.01); *H04L 67/10* (2013.01); *H04L 67/1097* (2013.01); *H04L 67/30* (2013.01)

(58) Field of Classification Search
USPC ........................................................ 709/215
See application file for complete search history.

(56) References Cited

U.S. PATENT DOCUMENTS

| 6,341,340 B1 | 1/2002 | Tsukerman |
| 9,792,320 B2 | 10/2017 | Bercovici et al. |
| 2005/0039001 A1 | 2/2005 | Hudis |
| 2009/0037679 A1 | 2/2009 | Kaushik |
| 2009/0240664 A1 | 9/2009 | Dinker |
| 2010/0030995 A1 | 2/2010 | Wang |
| 2011/0307450 A1 | 12/2011 | Hahn |

*Primary Examiner* — Hee Soo Kim
(74) *Attorney, Agent, or Firm* — Vista IP Law Group, LLP

(57) ABSTRACT

Systems for managing shared content in a cloud-based service platform. A method commences upon identifying one or more storage devices that store one or more content objects. The storage devices may be partitioned into geographically distant locations. A first partition in one geography is associated with a first set of content objects and a second partition is associated with a second set of content objects. An inviter-collaborator generates a set of outgoing collaboration attributes pertaining to a shared content object from the first partition. The outgoing collaboration attributes are stored on the inviter's partition. An invitee-collaborator accepts the invitation and generates a set of incoming collaboration attributes that derive from the set of outgoing collaboration attributes. The set of incoming collaboration attributes are stored on the invitee's partition. The invitations can be sent and received through operation of a web application that facilitates offering invitations and acceptance of those invitations.

20 Claims, 12 Drawing Sheets

ACCESSING SHARED CONTENT USING COLLABORATION ATTRIBUTE PARTITIONING

FIELD

This disclosure relates to managing shared content in a cloud-based service platform, and more particularly to techniques for accessing shared content using collaboration attribute partitioning.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The proliferation of cloud based services and systems continues to increase. Specifically, cloud-based content management services and platforms have impacted the way personal and corporate electronically stored information objects (e.g., files, images, videos, etc.) are stored, and has also impacted the way such personal and corporate content is shared and managed. One benefit of using such cloud-based platforms is the ability to securely share content among trusted collaborators who access shared content on a variety of user devices such as mobile phones, tablets, laptop computers, desktop computers, and/or other devices. Certain cloud-based shared content management platforms might further partition the shared content to improve access performance (e.g., using partitioned index files and partitioned shared content) so as achieve a particular degree of access and retrieval performance.

In some cases, an index might designate certain locations (e.g., physical and/or logical server location) for corresponding instances of shared content. For example, content that is controlled (e.g., owned) by a given enterprise might be purposefully located at a storage site that is near a majority of the enterprise users. The content index tables used to locate and access the controlled content can also be partitioned based on a geographical co-location technique, or on based on a computing platform size, or on the basis of a quanta of data (e.g., a certain number of files), or in accordance with any other regime. One such partitioning technique is called "sharding". One possible sharding operation serves to partition a database table horizontally (e.g., by row) to form a "shard" that can be located (e.g., in a particular geography or on a particular computing platform) so as to improve performance (e.g., access latency).

For example, a database table comprising an index to all content managed by a cloud-based shared content management platform might be sharded by, for example, an enterprise name. Content controlled by a particular enterprise would be stored on a computing platform that is located near the respective enterprise content. Such co-location of content and content index shards can improve the performance of access to controlled content. Unfortunately, the foregoing partitioning and/or sharding techniques can be limited at least in their performance (e.g., latency) pertaining to accessing content that is shared with a given user, group and/or enterprise. Specifically, while content and/or content indexes might be partitioned, the collaboration attributes defining shared content access (e.g., permissions, relationships to associated user-collaborators, content type, etc.) might still be centralized in one database table and/or location. In this case, for example, a user collaborating on a certain shared content object (e.g., file, folder, etc.) from another enterprise might need to query (e.g., for access permissions, shared content object ID, etc.) a centralized collaboration attribute table that can be in a location that is suboptimal as pertaining to access latency. In legacy deployments, such as un-sharded (e.g., centralized) deployments, some or all of the stored centralized attribute tables might need to be searched in order to access the shared content object. Further, a corresponding set of collaboration attributes pertaining to the shared content (e.g., permissions, etc.) might need to be accessed, possibly from a location that is geographically distant from the storage location of the shared content. Such accesses (e.g., to retrieve collaboration attributes) often detract from, or eliminate the gains that might have accrued by sharding the shared content. This problem is increasingly exacerbated as the number of collaborators increases. What is needed is a technique or techniques to improve over legacy approaches.

SUMMARY

The present disclosure provides a detailed description of techniques used in systems, methods, and in computer program products for accessing shared content using collaboration attribute partitioning. A method implementation commences upon identifying one or more storage devices that store one or more content objects, wherein the storage devices comprise at least a first partition associated with a first set of content objects and a second partition associated with a second set of content objects. An inviter-collaborator generates a set of outgoing collaboration attributes pertaining to a shared content object from the first partition. The outgoing collaboration attributes are stored on the inviter's partition. To share the shared content object, an invitee-collaborator accepts the invitation and generates a set of incoming collaboration attributes that derive from the set of outgoing collaboration attributes. The set of incoming collaboration attributes are stored on the owner/invitee's partition. The invitations can be sent and received through operation of a web application that facilitates offering invitations by a first user and acceptance of those invitations by a second user.

Further details of aspects, objectives, and advantages of the technological embodiments are described herein and in the following descriptions, drawings, and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
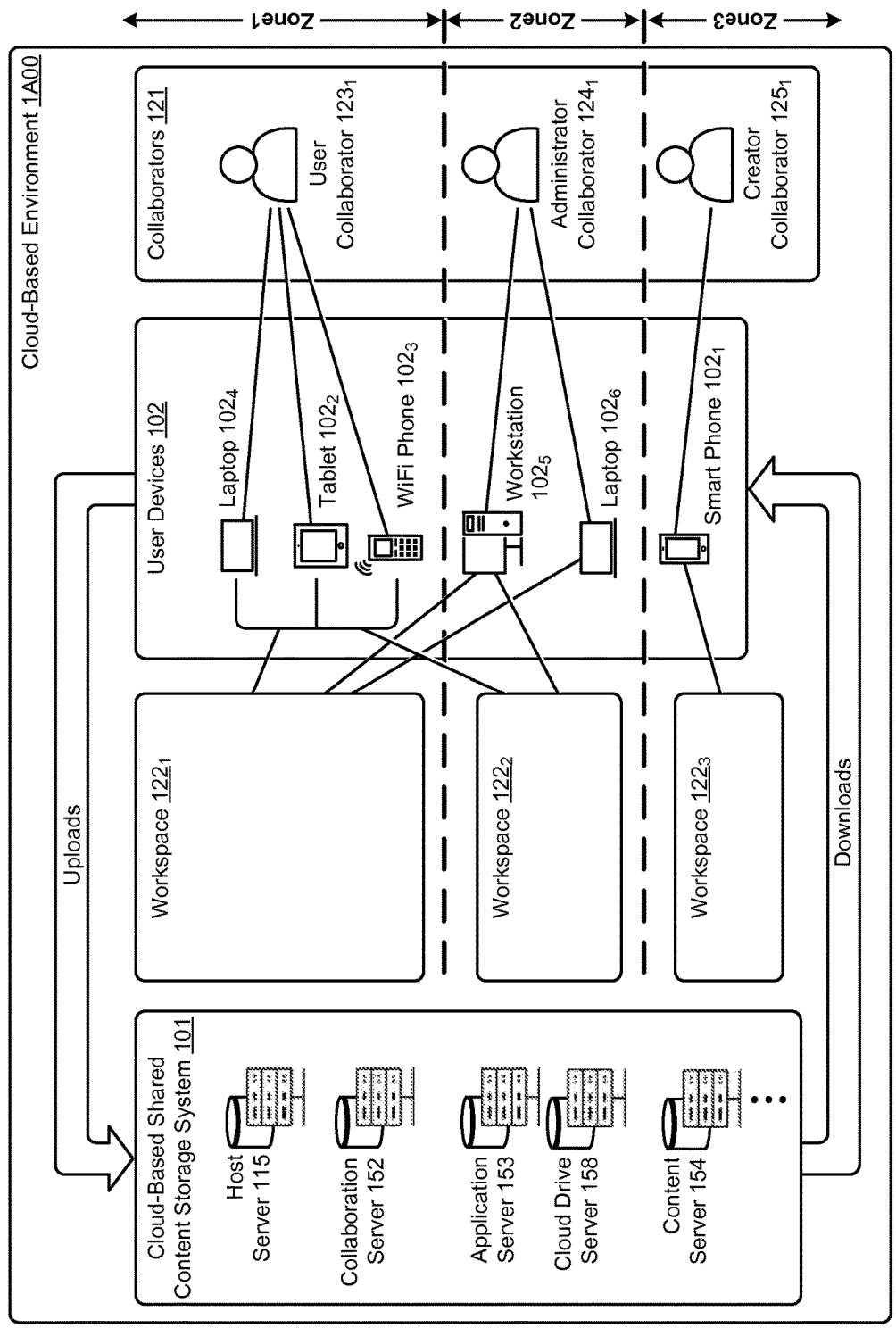
FIG. 1A presents a cloud-based environment including a cloud-based shared content management platform for accessing shared content using collaboration attribute partitioning, according to an embodiment.

Some embodiments of the present disclosure address the problem of delivering low-latency access to partitioned shared content and some embodiments are directed to approaches for implementing a protocol for generating a set of collaboration attributes associated with a given set of users to be stored in close proximity (e.g., physical and/or logical) to the one or more database partitions assigned to the users such that shared content access performance (e.g., latency) can be improved.

More particularly, disclosed herein and in the accompanying figures are exemplary environments, systems, methods, and computer program products for accessing shared content using collaboration attribute partitioning.

Overview

Disclosed herein is a system and protocol for generating sets of outgoing collaboration attributes that correspond to content collaboration invitations issued by a set of users. In some embodiments, a portion of the disclosed protocol generates a source partition (e.g., of the inviter) corresponding to incoming collaboration attributes. In one or more other embodiments, various partition mapping attributes are generated to characterize a destination partition (e.g., of the invitee) corresponding to a set of collaboration attributes. In some embodiments, the collaboration attributes can comprise a permissions identifier, a user identifier, an enterprise identifier, an item identifier, an item type identifier, or a collaboration identifier. Such techniques disclosed herein can address the problems attendant to delivering low-latency access to partitioned shared content.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" refers to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A presents a cloud-based environment 1A00 including a cloud-based shared content management platform for accessing shared content using collaboration attribute partitioning.

Embodiments can operate in such a cloud-based environment where many user-collaborators may be dispersed across physical boundaries, such as in different countries or zones (e.g., see zone1, zone2, and zone3), or across different logical boundaries (e.g., situated within different enterprises, or belonging to different collaboration groups, or taking on different roles, etc.). Alternatively, some embodiments can operate in such a cloud-based environment where many user-collaborators may be situated within the same countries or zones and/or situated within the same enterprise or set of enterprises.

As shown, certain users (e.g., collaborators 121) having various collaboration roles (e.g., user collaborator $123_1$, administrator collaborator $124_1$, creator collaborator $125_1$, etc.) can use one or more instances of user devices 102 to interact with one or more workspaces (e.g., workspace $122_1$, workspace $122_2$, workspace $122_3$ etc.) within the cloud-based environment 1A00. The workspaces can be stored in any location, and are at least partially maintained by components within a cloud-based shared content storage system 101. The cloud-based shared content storage system 101 supports any variety of processing elements and/or storage devices (e.g., a storage filer, a storage facility, etc.) and/or servers such as a host server 115, a collaboration server 152, an application server 153, a cloud drive server 158, a content server 154, etc.

Any of the users can access shared content from the cloud-based shared content storage system 101 without the additional process of manually downloading and storing a file locally on an instance of the user devices 102 (e.g., smart phone $102_1$, tablet $102_2$, WiFi phone $102_3$, laptop $102_4$, workstation $102_5$, laptop $102_6$, etc.). For example, a content object (e.g., computer file, text document, audio file, video file, image file, etc.) created by the creator collaborator $125_1$ might be viewed by the user collaborator $123_1$, yet without informing the user collaborator $123_1$ where the file is stored or without prompting the user collaborator $123_1$ for a directory in which to access the file. Such a facility streamlines the frequently repeated sharing and collaboration processes.

Functions and techniques performed by the cloud-based shared content storage system 101 and/or the client side components (e.g., user devices 102, a sync client on an instance of the user devices 102, etc.) are described herein with further details and with reference to several examples.

Figure 1B:
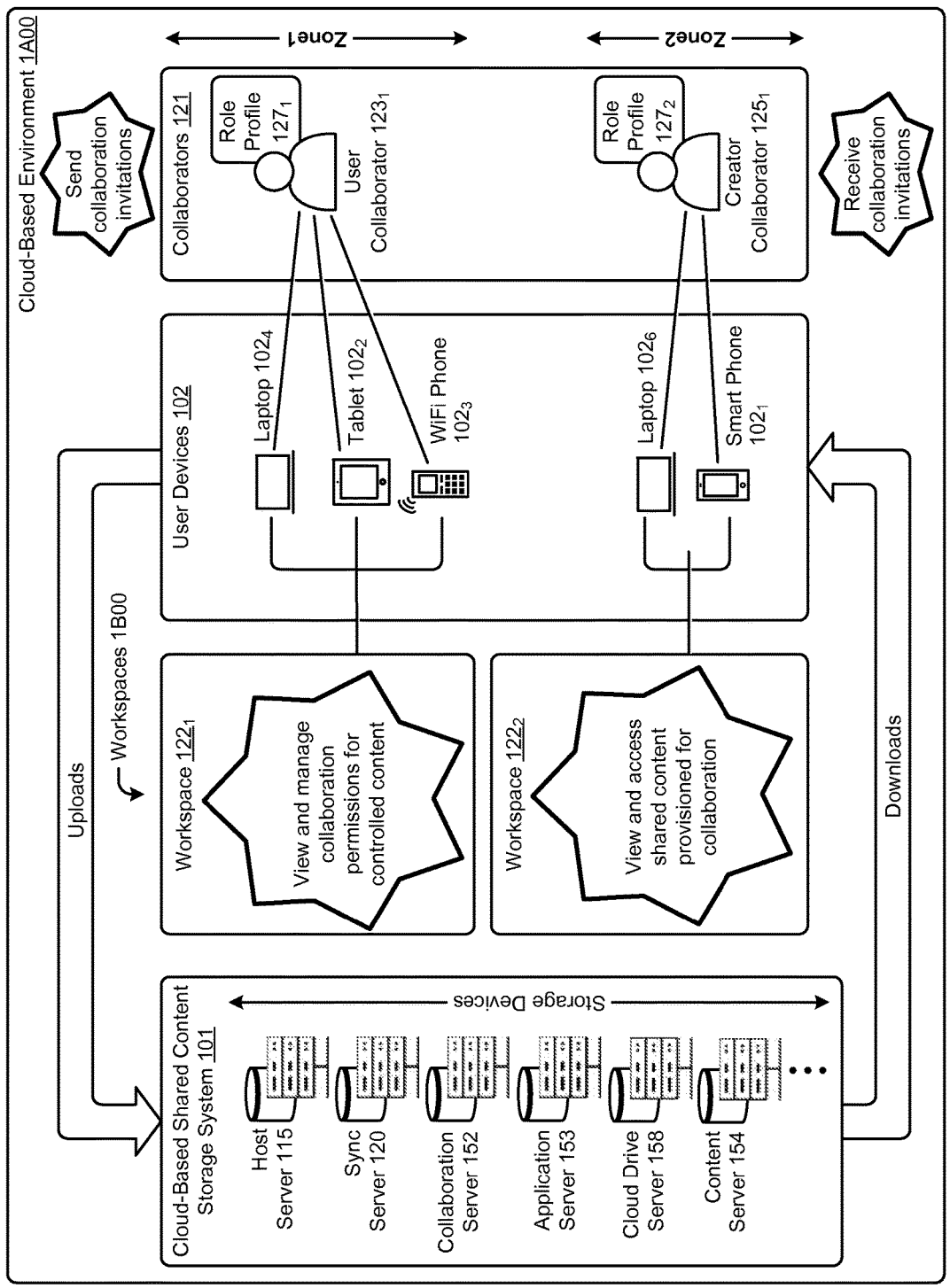
FIG. 1B presents a schematic view of workspaces that are populated with shared content that is dynamically accessed using collaboration attribute partitioning, according to an embodiment.

FIG. 1B presents a schematic view of workspaces 1B00 that are populated with shared content that is dynamically accessed using collaboration attribute partitioning. As an option, one or more variations of workspaces 1B00 or any aspect thereof may be implemented in the context of the architecture and functionality of the embodiments described herein. Also, the workspaces 1B00 or any aspect thereof may be implemented in any environment.

The embodiment shown in FIG. 1B is merely one example implementation of the cloud-based environment 1A00 where two or more of the collaborators 121 share a content object (e.g., computer file, electronic document, image, etc.) and/or a collection (e.g., folder) of content objects, and where each collaborator has a certain access (e.g., for viewing, editing, downloading, etc.) to the shared object in a respective collaborator-specific workspace (e.g., workspace $122_1$, workspace $122_2$, etc.). Moreover, a collaborator (e.g., the user collaborator $123_1$, and the creator collaborator $125_1$) can have an associated role profile (e.g., a role profile $127_1$, a role profile $127_2$, respectively). Such an associated role profile can comprise certain attributes such as user information (e.g., user ID, device ID, etc.) and/or user workspace metadata (e.g., file ID, etc.) and/or access permissions and/or role descriptions. One or more roles can be associated with one or more access configurations, and such roles and/or access configurations can be used in determining rules pertaining to how users share documents. Moreover, such roles and/or access configurations can be used in determining how users can view, preview, edit, download, sync, print, and otherwise access shared documents.

The embodiment shown in FIG. 1B indicates certain operations corresponding to accessing shared content using collaboration attribute partitioning. Specifically, a capability to view and manage collaboration permissions pertaining to controlled (e.g., owned) content created is shown within workspace $122_1$. For example, the creator collaborator $125_1$ might be able to view all the content the creator collaborator $125_1$ owns and/or otherwise controls in the workspace $122_1$.

The creator collaborator $125_1$ might further be able to invite others (e.g., user collaborator $123_1$) to share a portion of the controlled content (e.g., a file, folder, etc.) by specifying collaboration attributes (e.g., user ID, file ID, permissions, etc.) for each invitee. Also, a capability to view and access shared content provisioned for collaboration is shown in workspace $122_2$. For example, the user collaborator $123_1$ might receive and accept the foregoing collaboration invitation from the creator collaborator $125_1$ (e.g., the inviter) such that the shared content can be accessible according to the specified collaboration attributes (e.g., view only, edit, etc.).

Further, the collaboration server 152, or sync server 120, or any other server can use instances of storage devices to provide efficient access to the content being shared. In some cases, and as is disclosed herein, such shared content can be partitioned to improve access performance. According to the herein disclosed techniques, the collaboration attributes can also be partitioned to deliver low-latency access to the partitioned shared content. Such a collaboration attribute partitioning technique is shown and described as pertaining to FIG. 2.

Figure 2A:
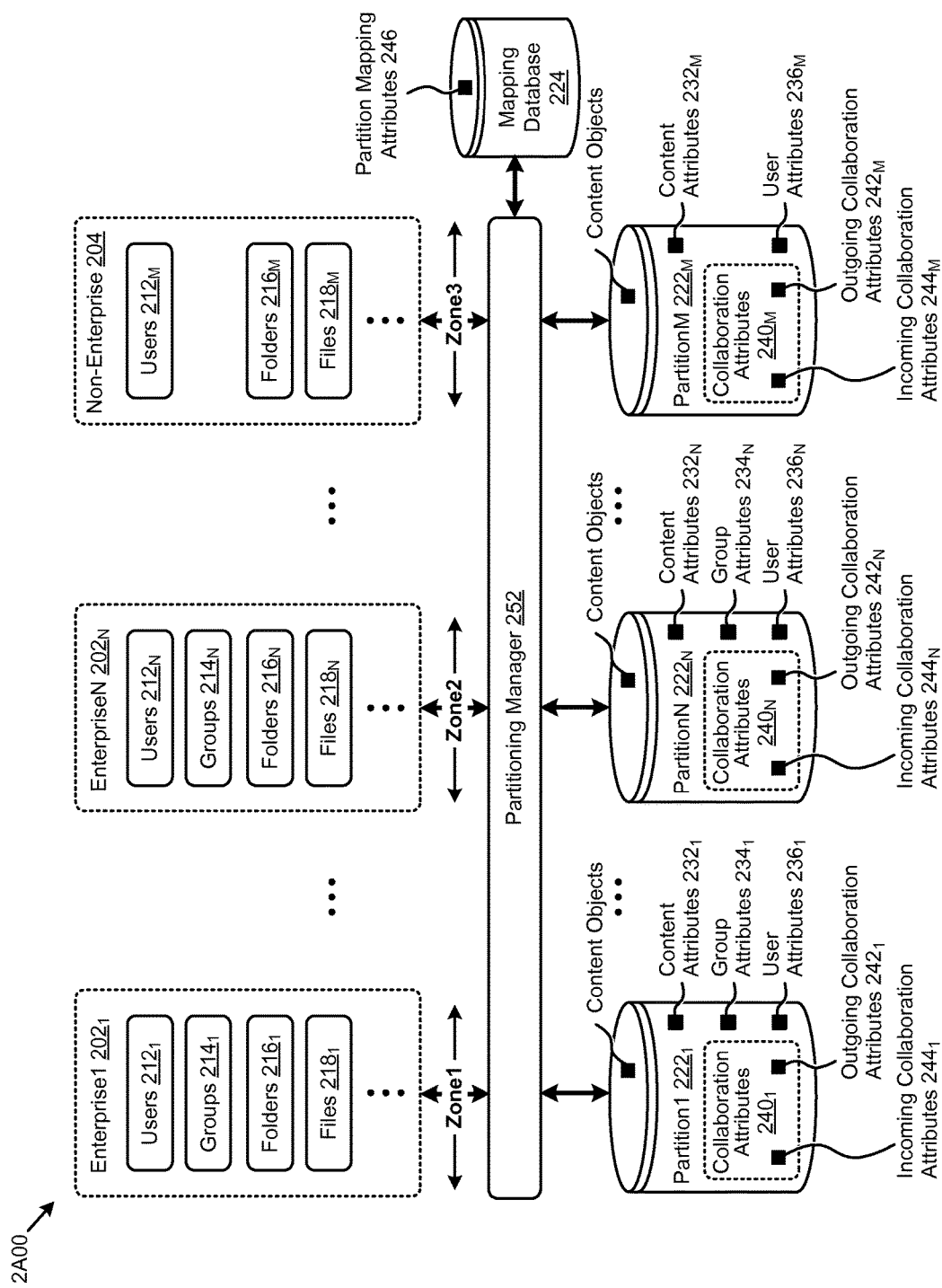
FIG. 2A illustrates a collaboration attribute partitioning technique as used in systems that support accessing shared content using collaboration attribute partitioning, according to an embodiment.

FIG. 2A illustrates a collaboration attribute partitioning technique 2A00 as used in systems that support accessing shared content using collaboration attribute partitioning. As an option, one or more variations of collaboration attribute partitioning technique 2A00 or any aspect thereof may be implemented in the context of the architecture and functionality of the embodiments described herein. Also, the collaboration attribute partitioning technique 2A00 or any aspect thereof may be implemented in any environment.

Strictly as one example, and as shown in FIG. 2A, users of a cloud-based shared content management platform might be segmented according to an enterprise (e.g., enterprise1 $202_1$, . . . , enterpriseN $202_N$) associated with a given user. In some cases, users not associated with an enterprise might be in a non-enterprise segment (e.g., non-enterprise 204). Other user segments and/or collections are possible. As shown, each enterprise might have corresponding information managed by the cloud-based shared content management platform pertaining to the users (e.g., users $212_1$, . . . , users $212_N$), user groups (e.g., groups $214_1$, . . . , groups $214_N$), content folders (e.g., folders $216_1$, . . . , folders $216_N$), content files (e.g., files $218_1$, . . . , files $218_N$), and/or other entities associated with the enterprise. The various instances of the non-enterprise 204 segment might also have associated information pertaining to users (e.g., users $212_M$), content folders (e.g., folders $216_M$), and/or content files (e.g., files $218_M$), yet might not have associated information pertaining to groups as shown. For example, the users $212_M$ in the non-enterprise 204 segment might comprise individual account users.

In one or more embodiments, a partitioning manager 252 can partition the data representing the information associated with the earlier mentioned segments to be stored and/or managed in one or more database partitions. Specifically, the data associated with enterprise1 $202_1$ can be assigned to a partition1 $222_1$, the data associated with enterpriseN $202_N$ can be assigned to a partitionN $222_N$, and/or the data associated with the non-enterprise 204 segment can be assigned to a partitionM $222_M$. More specifically, the information pertaining to the users $212_1$ and the groups $214_1$ can be represented in partition1 $222_1$ in a set of user attributes $236_1$ and a set of group attributes $234_1$, respectively. Further, the information pertaining to the folders $216_1$ and/or files $218_1$ can be represented in partition1 $222_1$ in a set of content attributes $232_1$. For example, the content attributes $232_1$ might comprise the file identifiers (e.g., file ID, item ID, etc.) and corresponding link (e.g., URL link) associated with the controlled content of enterprise1 $202_1$. As further shown, the information pertaining to the users $212_N$ and the groups $214_N$ can be represented in partitionN $222_N$ in a set of user attributes $236_N$ and a set of group attributes $234_N$, respectively. Further, the information pertaining to the folders $216_N$ and/or files $218_N$ can be represented in partitionN $222_N$ in a set of content attributes $232_N$. Also, the information pertaining to the users $212_M$ can be represented in partitionM $222_M$ in a set of user attributes $236_M$. Further, the information pertaining to the folders $216_M$ and/or files $218_M$ can be represented in partitionM $222_M$ in a set of content attributes $232_M$. Such partitioning can be used to improve the loading of storage devices and/or related computing resources, content access performance (e.g., latency), content search performance, and/or improve the performance of other operations. The shown partitioning according to enterprise and/or non-enterprise is merely one example. Partitioning based on other criteria (e.g., geography) is possible.

According to the collaboration attribute partitioning technique 2A00 and/or other herein disclosed techniques, certain collaboration attributes can also be partitioned to deliver low-latency access to the portions of the foregoing partitioned content that is shared among collaborators. Such techniques can be implemented for content sharing within a given partition (e.g., a user within enterprise1 $202_1$ of partition1 $222_1$, etc.), or among one or more partitions (e.g., a user in enterprise1 $202_1$ of partition1 $222_1$ sharing with a user in enterpriseN $202_N$ of partitionN $222_N$, a user in enterprise1 $202_1$ of partition1 $222_1$ sharing with a user in non-enterprise 204 of partitionM $222_M$, etc.). Specifically, as shown, the partitioning manager 252 can assign the collaboration attributes corresponding to a given segment to the one or more partitions designated for the segment. For example, a set of collaboration attributes $240_1$ associated with enterprise1 $202_1$ can be stored on partition1 $222_1$, a set of collaboration attributes $240_N$ associated with enterpriseN $202_N$ can be stored on partition1 $222_N$, and a set of collaboration attributes $240_M$ associated with the non-enterprise 204 segment can be stored on partitionM $222_M$.

As shown, the collaboration attributes can further comprise outgoing collaboration attributes (e.g., outgoing collaboration attributes $242_1$, outgoing collaboration attributes $242_N$, and outgoing collaboration attributes $242_M$) and/or incoming collaboration attributes (e.g., incoming collaboration attributes $244_1$, incoming collaboration attributes $244_N$, and incoming collaboration attributes $244_M$). For example, the outgoing collaboration attributes $242_1$ might characterize a collaboration invitation issued by a user (e.g., the inviter) from enterprise1 $202_1$ to a user (e.g., the invitee) in enterpriseN $202_N$. In this case, the outgoing collaboration attributes $242_1$ might comprise a user ID (e.g., of the invitee), an item ID (e.g., of the shared content), permissions (e.g., for accessing the shared content), and/or other attributes. Further, the incoming collaboration attributes $244_N$ might characterize the collaboration invitation as received by the invitee in enterpriseN $202_N$. In this case, the incoming collaboration attributes $244_N$ might comprise a user ID (e.g., of the invitee), an item ID (e.g., of the shared content), permissions (e.g., for accessing the shared content), and/or other attributes. As shown, the partitioning manager 252 can further generate a set of partition mapping attributes 246 in a mapping database 224. Specifically, the partition mapping attributes 246 can characterize the one or more destination partitions (e.g., the invitee partitions) of an outgoing collaboration invitation and/or the one or more source partitions (e.g., the inviter partitions) of an incoming collaboration invitation.

Using the collaboration attribute partitioning technique 2A00, each user can quickly access the collaboration attributes associated with all the collaborations of the user (e.g., outgoing and/or incoming) since the collaboration attribute information is located on the one or more partitions assigned to the user. The shared content associated with the collaborations can further be quickly accessed using the partition mapping attributes 246 in the mapping database 224. One embodiment of an implementation of the collaboration attribute partitioning technique 2A00 and/or other herein disclosed techniques for accessing shared content using collaboration attribute partitioning is described as pertains to FIG. 2B.

Figure 2B:
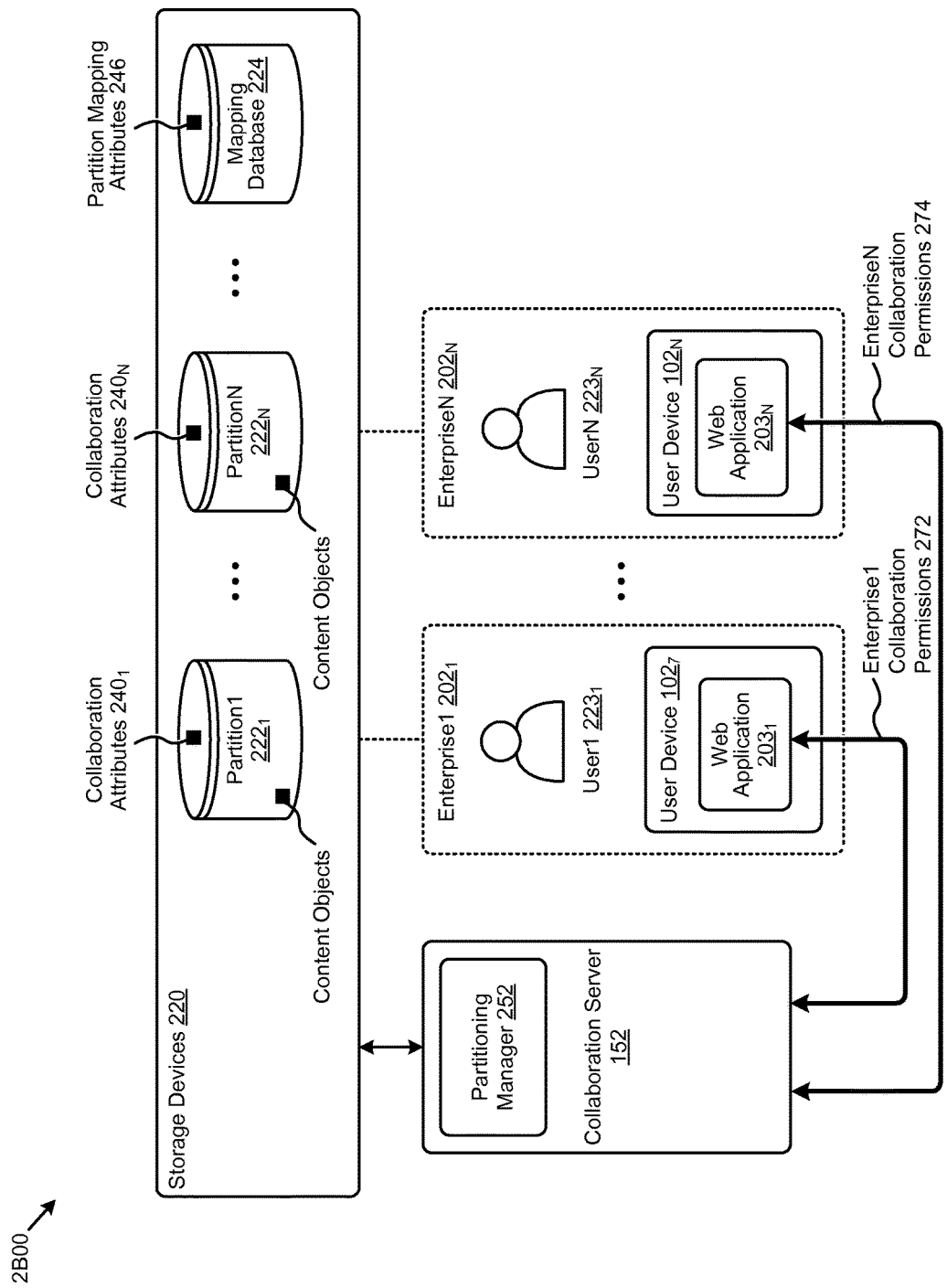
FIG. 2B presents a data flow to implement techniques for accessing shared content using collaboration attribute partitioning, according to an embodiment.

FIG. 2B presents a data flow 2B00 to implement techniques for accessing shared content using collaboration attribute partitioning. As an option, one or more variations of data flow 2B00 or any aspect thereof may be implemented in the context of the architecture and functionality of the embodiments described herein. Also, the data flow 2B00 or any aspect thereof may be implemented in any environment.

The shown data flow depicts multiple users (e.g., user1 $223_1$ from enterprise1 $202_1$ and userN $223_N$ from enterpriseN $202_N$) collaborating on shared content using collaboration attribute partitioning according to the herein disclosed techniques. Such collaboration on shared content can take place concurrently with other accesses in multiple concurrent sessions involving multiple concurrently sharing users. Establishing user content access provisioning of the shared content can be performed by the collaboration server 152. In some cases, such access can be provisioned to the collaborators by the collaboration server 152 based on certain collaboration permissions (e.g., enterprise1 collaboration permissions 272 and/or enterpriseN collaboration permissions 274) issued by the collaboration inviter and/or received by the collaboration invitee. Further, the collaboration server 152, or sync server 120, or any other server can use certain instances of storage devices 220 to provide efficient access to the content being shared. For example, the collaboration server 152 might retrieve and manipulate representations (e.g., views, previews, links, etc.) of the shared content objects rather than manipulate the source data comprising the shared content objects when providing access to collaborators. In some embodiments, the collaboration server 152 and the storage devices 220 can be included in a cloud-based shared content management platform that implements techniques for accessing shared content using collaboration attribute partitioning.

Specifically, for example, the partitioning manager 252 might operate on the collaboration server 152 to implement the collaboration attribute partitioning technique 2A00 described in FIG. 2A. In one or more embodiments, the collaboration attribute partitioning technique 2A00 can generate, in the storage devices 220, the partition1 $222_1$ comprising the collaboration attributes $240_1$ associated with user1 $223_1$ of enterprise1 $202_1$, the partitionN $222_N$ comprising the collaboration attributes $240_N$ associated with userN $223_N$ of enterpriseN $202_N$, and/or the mapping database 224 comprising the partition mapping attributes 246. Given such partitioning of collaboration attributes, the user1 $223_1$ can use a web application $203_1$ (e.g., provided by the cloud-based shared content management platform) on a user device $102_7$ to issue a collaboration invitation comprising the enterprise1 collaboration permissions 272 to userN $223_N$. Attributes characterizing the collaboration invitation issued by the user1 $223_1$ can be included in the collaboration attributes $240_1$. The collaboration invitation can be received (and accepted) by the userN $223_N$ using a web application $203_N$ on a user device $102_N$. The attributes characterizing the received collaboration invitation can be included in the collaboration attributes $240_N$. To retrieve the shared content associated with the invitation, the userN $223_N$ can access the collaboration attributes $240_N$ local to the partitionN $222_N$ of the enterpriseN $202_N$ to extract the enterpriseN collaboration permissions 274 necessary for the collaboration server 152 to provision access to the shared content. In some cases, the enterpriseN collaboration permissions 274 are based on the enterprise1 collaboration permissions 272.

The subsystem shown in FIG. 2B presents merely one partitioning. The specific example shown is purely exemplary, and other partitioning is reasonable. One embodiment of an environment and protocol supporting such systems, subsystems, and/or partitionings for accessing shared content using collaboration attribute partitioning is shown in FIG. 3.

Figure 3A:
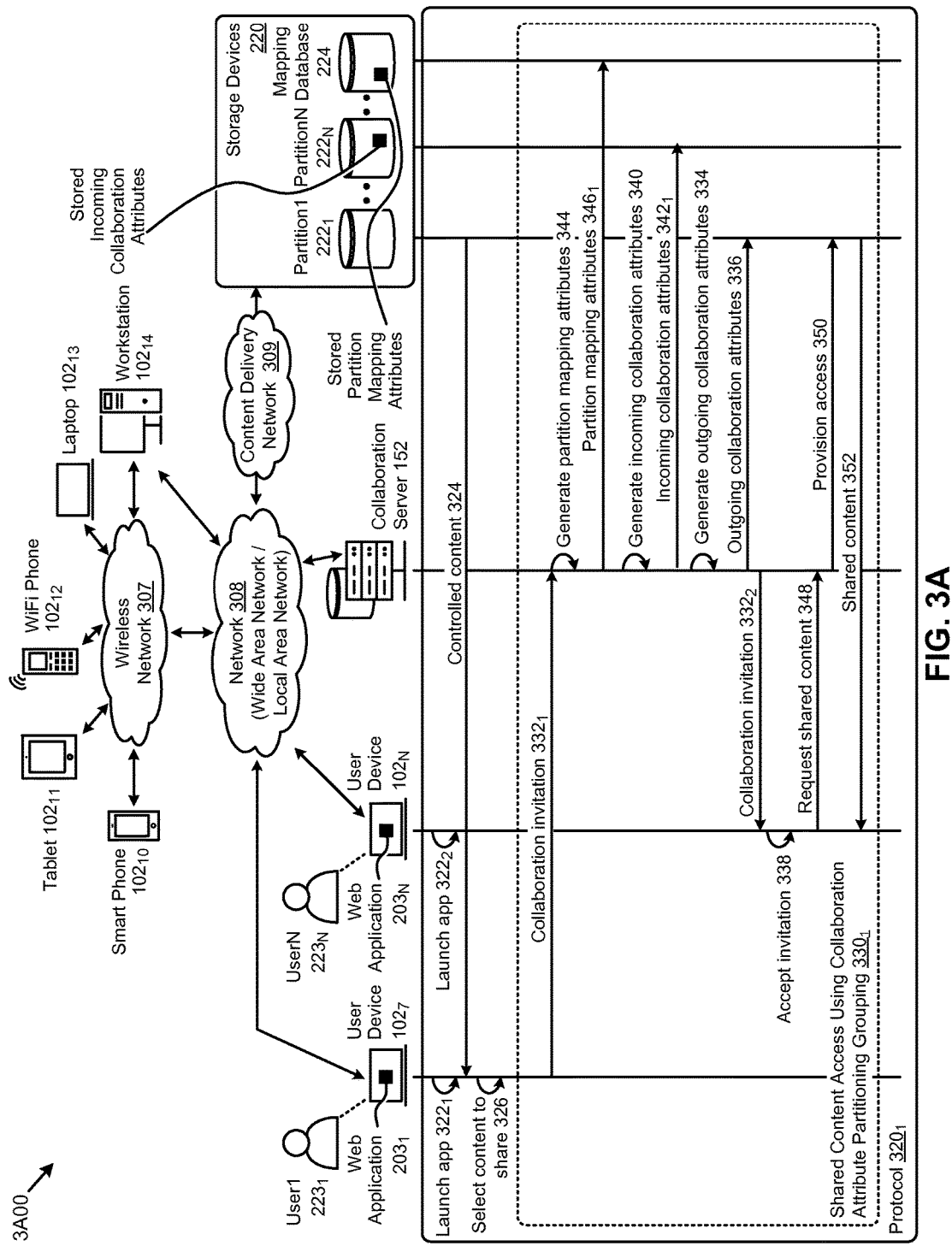
FIG. 3A and FIG. 3B depict environments that can support embodiments of various protocols for accessing shared content using collaboration attribute partitioning.

FIG. 3A is an environment 3A00 that can support embodiments of a protocol for accessing shared content using collaboration attribute partitioning. As an option, one or more variations of environment 3A00 or any aspect thereof may be implemented in the context of the architecture and functionality of the embodiments described herein. Also, the environment 3A00 or any aspect thereof may be implemented in any environment.

As shown in FIG. 3A, the environment 3A00 comprises various computing systems (e.g., servers and devices) interconnected by a wireless network 307, a network 308, and a content delivery network 309. The wireless network 307, the network 308, and the content delivery network 309 can comprise any combination of a wide area network (e.g., WAN), local area network (e.g., LAN), cellular network, wireless LAN (e.g., WLAN), or any such means for enabling communication of computing systems. The wireless network 307, the network 308, and the content delivery network 309 can also collectively be referred to as the Internet. The content delivery network 309 can comprise any combination of a public network and a private network. More specifically, environment 3A00 can comprise at least one instance of the earlier described collaboration server 152 and storage devices 220. The servers and storage devices shown in environment 3A00 can represent any single computing system with dedicated hardware and software, multiple computing systems clustered together (e.g., a server farm, a host farm, etc.), a portion of shared resources on one or more computing systems (e.g., a virtual server), or any combination thereof. For example, the collaboration server 152 and the storage devices 220 can comprise a cloud-based content management platform that provides shared content management and storage services.

The environment 3A00 further comprises instances of user devices 102 (e.g., user device $102_7$, user device $102_N$) that can represent one of a variety of other computing devices (e.g., a smart phone $102_{10}$, a tablet $102_{11}$, a WiFi phone $102_{12}$, a laptop $102_{13}$, a workstation $102_{14}$, etc.) having software (e.g., web application $203_1$, web application $203_N$, etc.) and hardware (e.g., a graphics processing unit, display, monitor, etc.) capable of processing and displaying information (e.g., web page, graphical user interface, etc.) on a display. The user devices can further communicate information (e.g., web page request, user activity, electronic files, computer files, etc.) over the wireless network 307, the network 308, and the content delivery network 309. As shown, the user device $102_7$ can be operated by the user1 $223_1$ and the user device $102_N$ can be operated by the userN $223_N$. Also, according to the collaboration attribute partitioning technique 2A00, the partition1 $222_1$ associated with user1 $223_1$, the partitionN $222_N$ associated with userN $223_N$, and the mapping database 224 and/or other storage facilities can be included in the storage devices 220.

As shown in the protocol $320_1$, a grouping $330_1$ can represent one embodiment of certain messages and operations used in systems and protocols for accessing shared content using collaboration attribute partitioning. Specifically, such a grouping of interactions might commence with the user1 $223_1$ (e.g., the inviter) issuing a collaboration invitation (see message $332_1$) to the userN $223_N$ (e.g., the invitee). The collaboration invitation might be specified by the inviter in a web application interface that allows the selection of various collaboration attributes such as the item to be shared, the invitee, the access permissions for the invitee, and/or other attributes. Such a collaboration invitation might be received from the web application $203_1$ by the collaboration server 152 (see message $332_1$).

The collaboration server 152 might then generate a set of partition mapping attributes (see operation 344) associated with the outgoing collaboration attributes and/or the incoming collaboration attributes for storage in the mapping database 224 (see message $346_1$). The collaboration server 152 can further generate a set of incoming collaboration attributes (see operation 340) characterizing the collaboration invitation for storage on partitionN $222_N$ (see message $342_1$). Still further, the collaboration server 152 might respond by generating a set of outgoing collaboration attributes (see operation 334) characterizing the collaboration invitation for storage on partition1 $222_1$ (see message 336). The collaboration server 152 might then forward a collaboration invitation to the user device $102_N$ of userN $223_N$ (see message $332_2$) such that userN $223_N$ can accept the invitation (see operation 338).

When the userN $223_N$ requests the shared content (see message 348), the collaboration server can use the stored incoming collaboration attributes and/or the stored partition mapping attributes to provision access 350 to the shared content (see message 352). Such provisioning can enable access to the shared content at the user device $102_N$ according to the permissions included in the stored incoming collaboration attributes. Some permissions can be derived from the permissions specified by user1 $223_1$ in the collaboration invitation.

The foregoing techniques pertaining to protocol $320_1$ is merely one possibility. Other messages and operations are possible, such as is shown and discussed as pertains to FIG. 3B.

Figure 3B:
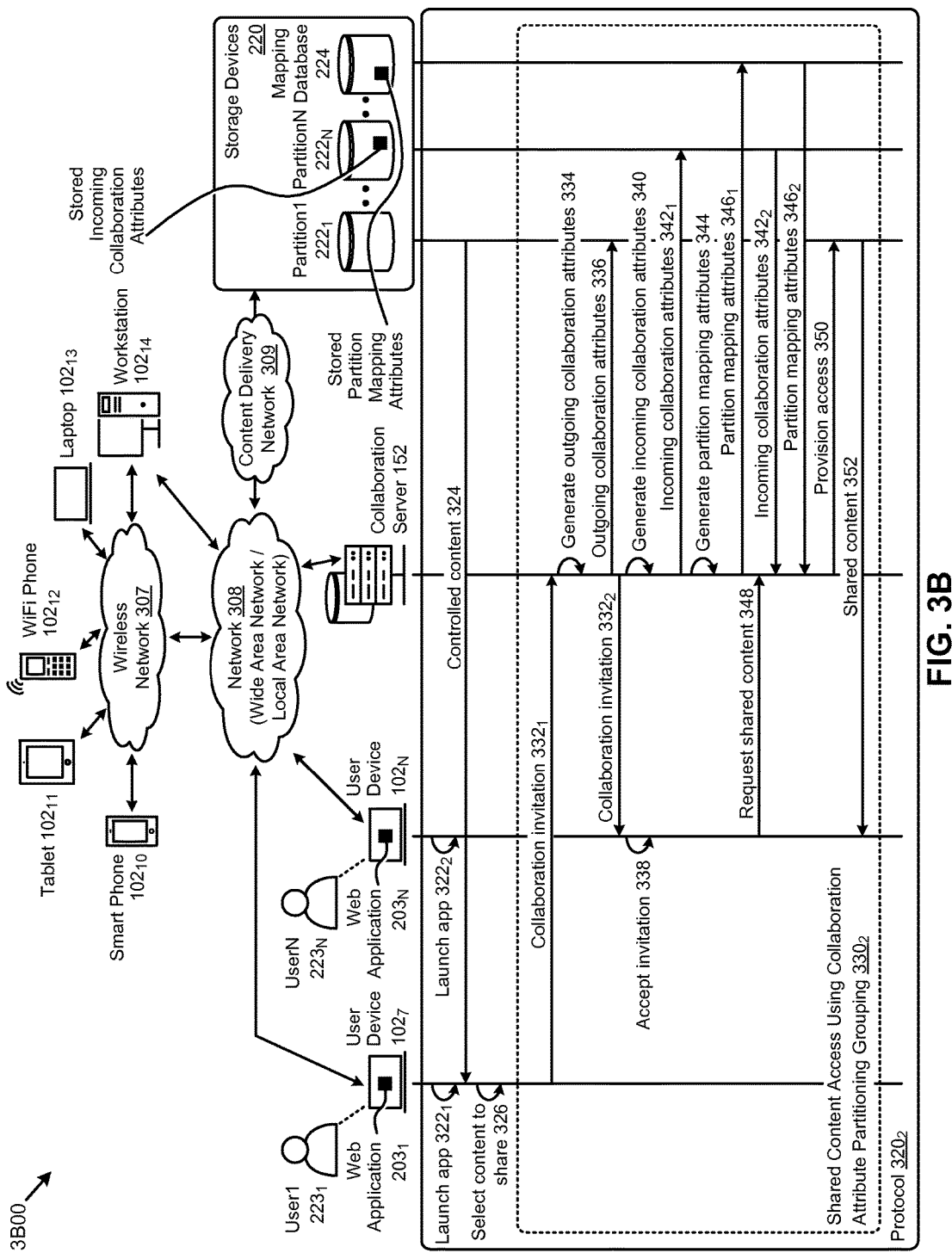

FIG. 3B is an environment 3B00 that can support embodiments of a protocol for accessing shared content using collaboration attribute partitioning. As an option, one or more variations of environment 3B00 or any aspect thereof may be implemented in the context of the architecture and functionality of the embodiments described herein. Also, the environment 3B00 or any aspect thereof may be implemented in any environment.

As shown, the user device $102_7$, the user device $102_N$, the collaboration server 152, and the storage devices 220 can participate in a set of high-level interactions (e.g., operations, messages, etc.) in protocol $320_2$. Specifically, as shown, the web application $203_1$ can be launched at the user device $102_7$ (see operation $322_1$) and the web application $203_N$ can be launched at the user device $102_N$ (see operation $322_2$). Such a web application, for example, might be provided by the cloud-based content management platform to facilitate user content collaboration. Upon launch of the web application $203_1$, the content controlled by user1 $223_1$ can be provisioned to a workspace for viewing at the user device $102_7$ (see message 324). The user1 $223_1$ might then select certain content from the controlled content to share with another user (e.g., userN $223_N$) (see operation 326).

As highlighted in the protocol $320_2$, a grouping $330_2$ can represent one embodiment of certain messages and operations used in systems and protocols for accessing shared content using collaboration attribute partitioning. Specifically, such a grouping of interactions might commence with the user1 $223_1$ (e.g., the inviter) issuing a collaboration invitation to the userN $223_N$ (e.g., the invitee). The collaboration invitation might be specified by the inviter in a web application interface that allows the selection of various collaboration attributes such as the item to be shared, the invitee, the access permissions for the invitee, and/or other attributes. Such a collaboration invitation might be received from the web application $203_1$ by the collaboration server 152 (see message $332_1$). The collaboration server 152 might respond by generating a set of outgoing collaboration attributes (see operation 334) characterizing the collaboration invitation for storage on partition1 $222_1$ (see message 336). The collaboration server 152 might then forward the collaboration invitation to the user device $102_N$ of userN $223_N$ (see message $332_2$) such that userN $223_N$ can accept the invitation (see operation 338). The collaboration server 152 can further generate a set of incoming collaboration attributes (see operation 340) characterizing the collaboration invitation for storage on partitionN $222_N$ (see message $342_1$). The collaboration server 152 can also generate a set of partition mapping attributes (see operation 344) associated with the outgoing collaboration attributes and/or the incoming collaboration attributes for storage in the mapping database 224 (see message $346_1$).

When the userN $223_N$ requests the shared content (see message 348), the collaboration can use the incoming collaboration attributes (see message $342_2$) and/or the partition mapping attributes (see message $346_2$) to provision access 350 to the shared content (see message 352). Such provisioning can enable access to the shared content at the user device $102_N$ according to the permissions included in the incoming collaboration attributes. Permissions can be further interrelated and/or derived from the permissions specified by user1 $223_1$ in the collaboration invitation. One embodiment of data structures used for interrelating permissions and/or other attributes in the herein disclosed techniques is shown and described as pertains to FIG. 4.

Figure 4:
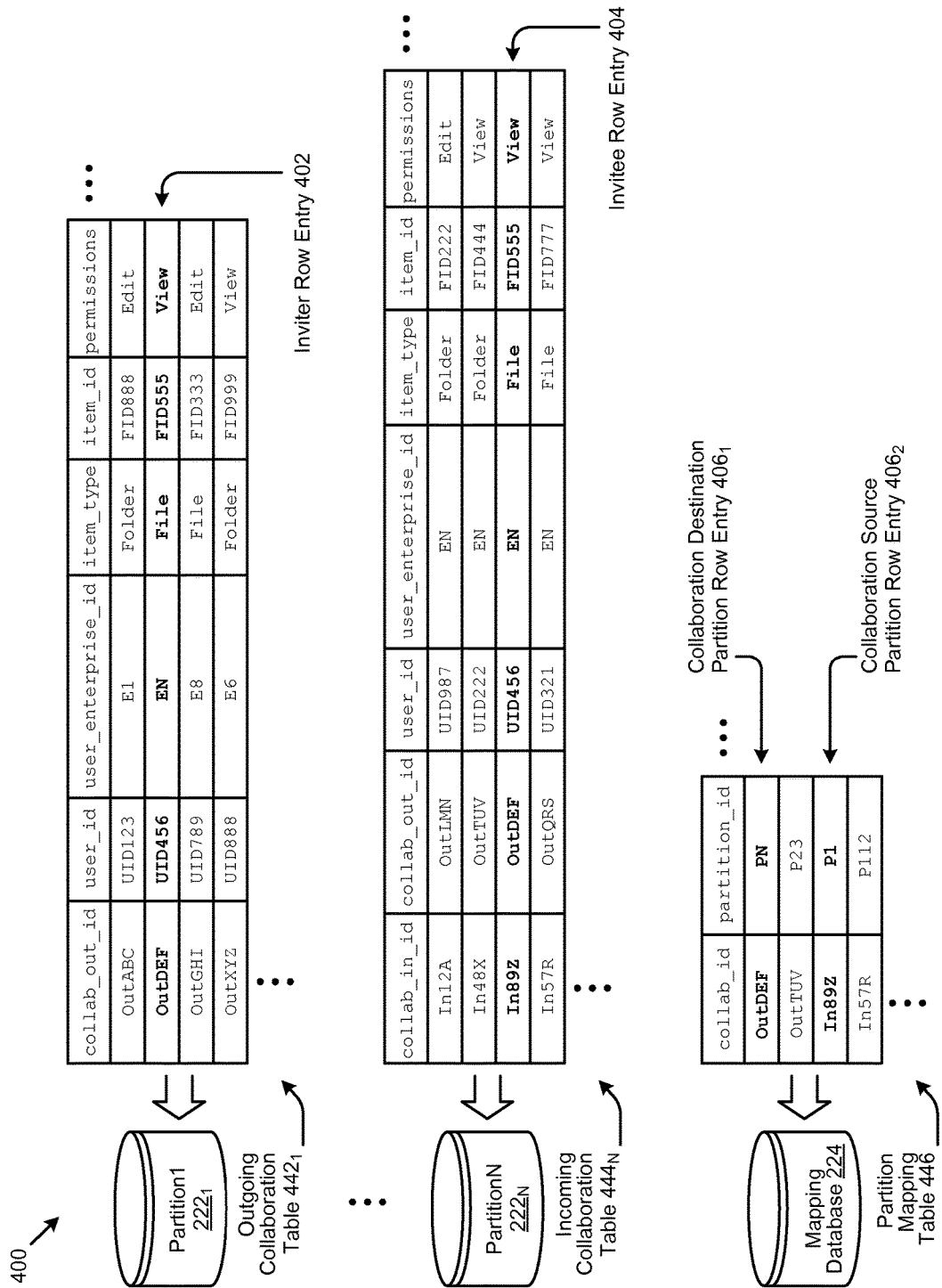
FIG. 4 depicts interrelated data structures used in systems for accessing shared content using collaboration attribute partitioning, according to some embodiments.

FIG. 4 depicts interrelated data structures 400 used in systems for accessing shared content using collaboration attribute partitioning. As an option, one or more variations of the interrelated data structures 400 or any aspect thereof may be implemented in the context of the architecture and functionality of the embodiments described herein. Also, the interrelated data structures 400 or any aspect thereof may be implemented in any environment.

The embodiment shown in FIG. 4 is one example of a set of data structures that can be used for accessing shared content using collaboration attribute partitioning. Specifically, the interrelated data structures 400 shows an outgoing collaboration table $442_1$ that can store outgoing collaboration attributes (e.g., outgoing collaboration attributes $242_1$), an incoming collaboration table $444_N$ that can store incoming collaboration attributes $244_1$ (e.g., incoming collaboration attributes $244_N$), and a partition mapping table 446 that can store partition mapping attributes (e.g., partition mapping attributes 246). According to the herein disclosed techniques, the outgoing collaboration table $442_1$, the incoming collaboration table $444_N$, and the partition mapping table 446 might be stored in the partition1 $222_1$, the partitionN $222_N$, and the mapping database 224, respectively. Moreover, a partition mapping database might separate data into several relations. For example, a partition mapping database might comprise two distinct partition mapping relations (e.g., one for the outgoing collaboration attributes, one for the incoming collaboration attributes).

As shown, the outgoing collaboration table $442_1$ can comprise multiple rows of associated outgoing collaboration attributes each corresponding to a respective attribute type (e.g., column), such as collab_out_id, user_id, user_enterprise_id, item_type, item_id, permissions, and/or other attribute types. In some cases, the collab_out_id can represent the primary key for the row of attributes. According to one or more embodiments, when a user (e.g., inviter) issues a collaboration invitation, a new row can be added to the outgoing collaboration table in the partition assigned to the inviter. For example, user1 $223_1$ might issue a collaboration invitation that invokes an inviter row entry 402 in the outgoing collaboration table $442_1$. At least a portion of the outgoing collaboration attributes associated with the collaboration invitation might comprise collab_out_id=OutDEF, user_id=UID456, ent_id=EN, item_type=File, item_id=FID555, and permissions=view. In this case, the collaboration invitation is issued to user UID456 from enterprise EN for view only privileges on file FID555.

Further, the incoming collaboration table $444_1$ can comprise multiple rows of associated incoming collaboration attributes each corresponding to a respective attribute type (e.g., column), such as collab_in_id, collab_out_id, user_id, user_enterprise_id, item_type, item_id, permissions, and/or other attribute types. In some cases, the collab_in_id can represent the primary key for the row of attributes. When a user (e.g., invitee) receives a collaboration invitation, a new row can be added to the incoming collaboration table in the partition assigned to the invitee. For example, userN $223_N$ might receive the collaboration invitation from user1 $223_1$ that invokes an invitee row entry 404 in the incoming collaboration table $444_N$. At least a portion of the incoming collaboration attributes might be a copy of, or derive from, or point to, or otherwise be associated with the collaboration invitation, and might comprise collab_in_id=In89Z, collab_out_id=OutDEF, user_id=UID456, ent_id=EN, item_type=File, item_id=FID555, and permissions=view. As shown, the incoming collaboration attributes (e.g., permissions=view) comprising the invitee row entry 404 are based on the outgoing collaboration attributes (e.g., permissions=view) comprising the inviter row entry 402. Some embodiments maintain consistency between the invitee row entries and any copies of the same data in the inviter row entries. Other embodiments reduce or eliminate data duplication between the invitee row entries and the inviter row entries. In some such cases that serve to eliminate or reduce duplication, location pointers (e.g., storage location references, URLs, URIs, etc.) that point from one row entry (e.g., an invitee row entry) that is stored on one partition to a second row entry (e.g., an inviter row entry) on another partition.

As earlier mentioned, the partition mapping attributes comprising the partition mapping table 446 can characterize the one or more destination partitions (e.g., the invitee partitions) of an outgoing collaboration invitation and/or the one or more source partitions (e.g., the inviter partitions) of an incoming collaboration invitation. Specifically, as shown, the issued collaboration invitation that invoked the inviter row entry 402 can further invoke a collaboration destination partition row entry 406$_1$. For example, the collaboration destination partition row entry 406$_1$ indicates the destination partition for collab_id=OutDEF is partition_id=PN (e.g., assigned to userN 223$_N$). Also, the received collaboration invitation that invoked the invitee row entry 404 can further invoke a collaboration source partition row entry 406$_2$. For example, the collaboration source partition row entry 406$_2$ indicates the source partition for collab_id=In89Z is partition_id=P1 (e.g., assigned to user1 223$_1$). Other distributions of such attributes are possible. For example, in one embodiment, the mapping table stores only the partition id for a given row entry. In such a case, the partition_id for collab_id=OutDEF" would be P1 and the partition_id for collab_id=In89z would be PN. The data linking corresponding in/out row tables need not be stored in the mapping table, rather, links can be made by storing the collab_out_id in the incoming collaboration table.

The interrelated data structures 400 are merely one example. Other possible data structures can be used for accessing shared content using collaboration attribute partitioning according to the herein disclosed techniques. For example, the outgoing collaboration attributes and the incoming collaboration attributes associated with a give partition might be stored in a single database table. In some cases, the single database table might have one or more mutable fields and/or one or more immutable fields. Further, the shown attribute types (e.g., columns) for the outgoing collaboration table 442$_1$ and the incoming collaboration table 444$_N$ are merely examples. Other attribute types are possible in one or more embodiments. Additional examples of attribute types for the outgoing collaboration table 442$_1$ and the incoming collaboration table 444$_N$ are shown in Table 1 and Table 2, respectively. Specifically, some additional attribute types can facilitate the implementation of the herein disclosed techniques for sharing among various entities such as users, groups, enterprises, and/or other possible segments.

TABLE 1

Example outgoing collaboration table attribute types (e.g., columns)

| Ref | Example Table Column |
|---|---|
| 1 | item_user_identifier |
| 2 | item_user_enterprise_identifier |
| 3 | last_item_activity |
| 4 | accepted |
| 5 | created |
| 6 | updated |
| 7 | invite_accepted_on |
| 8 | view_path |
| 9 | folder_collab_access_id |
| 10 | notification |
| 11 | current_user_id |
| 12 | current_user_enterprise_id |

TABLE 2

Example incoming collaboration table attribute types (e.g., columns)

| Ref | Example Table Column |
|---|---|
| 1 | item_user_id |
| 2 | item_user_enterprise_id |
| 3 | accepted |
| 4 | created |
| 5 | updated |

Figure 5:
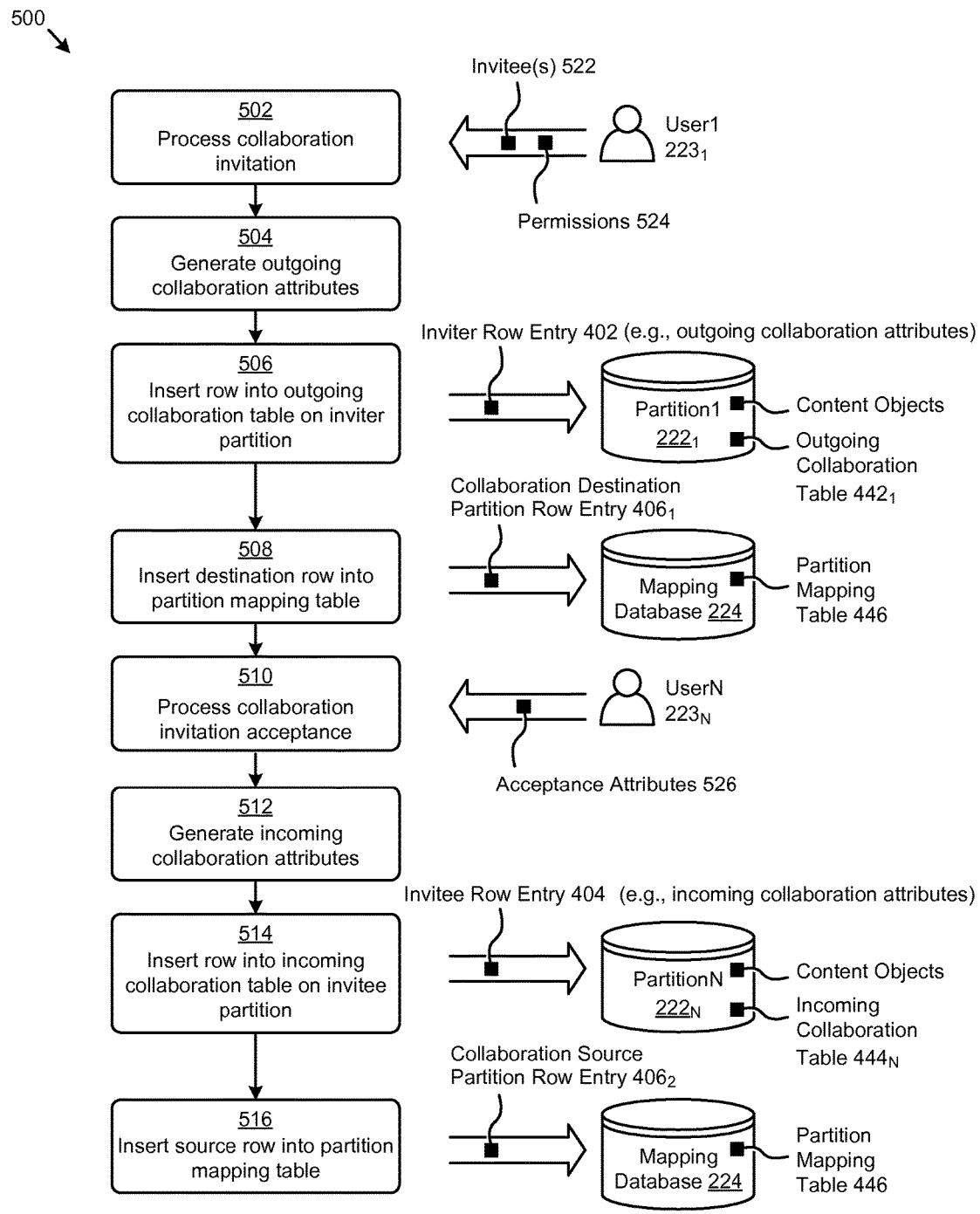
FIG. 5 illustrates a collaboration generation technique as used in systems for accessing shared content using collaboration attribute partitioning, according to some embodiments.

FIG. 5 illustrates a collaboration generation technique 500 as used in systems for accessing shared content using collaboration attribute partitioning. As an option, one or more variations of collaboration generation technique 500 or any aspect thereof may be implemented in the context of the architecture and functionality of the embodiments described herein. Also, the collaboration generation technique 500 or any aspect thereof may be implemented in any environment.

The collaboration generation technique 500 presents one embodiment of certain steps for generating a collaboration arrangement between two or more entities using the herein disclosed techniques for accessing shared content using collaboration attribute partitioning. In one or more embodiments the steps and underlying operations shown in the collaboration generation technique 500 can be executed by a collaboration server in a cloud-based shared content management platform. Strictly for reference in this embodiment, the collaboration generation technique 500 further depicts the earlier described user1 223$_1$, userN 223$_N$, the partition1 222$_1$, the partitionN 222$_N$, and the mapping database 224.

Specifically, the collaboration generation technique 500 can commence with processing a collaboration invitation (see step 502). For example, the user1 223$_1$ (e.g., the inviter) might issue the collaboration invitation specifying one or more instances of invitees 522 and one or more associated instances of permissions 524. Using the collaboration invitation, a set of outgoing collaboration attributes can be generated (see step 504). The generated outgoing collaboration attributes can be stored by inserting a row comprising the outgoing collaboration attributes into an outgoing collaboration table in the partition assigned to the inviter (e.g., user1 223$_1$) (see step 506). For example, the inviter row entry 402 can be inserted into the outgoing collaboration table 442$_1$ in the partition1 222$_1$. The collaboration generation technique 500 might then insert a destination row into a partition mapping table corresponding to the outgoing collaboration table row entry (see step 508). For example, the collaboration destination partition row entry 406$_1$ can be inserted into the partition mapping table 446 in the mapping database 224.

An acceptance of the collaboration invitation can be processed (see step 510). For example, the userN 223$_N$ (e.g., the invitee) might deliver an acceptance of the collaboration invitation specifying one or more instances of acceptance attributes 526 (e.g., acceptance conditions, timestamp, etc.). The collaboration generation technique 500 might then generate a set of incoming collaboration attributes (see step 512). The generated incoming collaboration attributes can be stored by inserting a row comprising the incoming collaboration attributes into an incoming collaboration table in the partition assigned to the invitee (e.g., userN 223$_N$) (see step 514). For example, the invitee row entry 404 can be inserted into the incoming collaboration table 444$_N$ in the partitionN 222$_N$. The collaboration generation technique 500 might then insert a source row into a partition mapping table corresponding to the incoming collaboration table row entry (see step 516). For example, the collaboration source partition row entry 406$_2$ can be inserted into the partition mapping table 446 in the mapping database 224.

The collaboration generation technique 500 presents merely one example of a use case implementing the herein disclosed techniques for accessing shared content using collaboration attribute partitioning. Other use cases, operations, and/or scenarios are possible. Additional use case examples are shown in Table 3, Table 4, and Table 5. For reference, an outgoing collaboration table is referred to as collab_out and an incoming collaboration table is referred to as collab_in.

TABLE 3

Example collaboration creation use cases

| | | Database Operations | |
|---|---|---|---|
| Ref | Use Case | Inviter Partition | Invitee Partition |
| 1 | Create a single user collaboration where the inviter and invitee belong to the same enterprise | Insert row into collab_out | Insert row into collab_in |
| 2 | Create a single user collaboration where the inviter and invitee belong to two different enterprises | Insert row into collab_out | Insert row into collab_in |
| 3 | Create a single user collaboration where the inviter belongs to an enterprise and the invitee is a non-enterprise user | Insert row into collab_out | Insert row into collab_in |
| 4 | Create a single user collaboration where the inviter is a non-enterprise user and the invitee is an enterprise user | Insert row into collab_out | Insert row into collab_in |
| 5 | Create a single user collaboration where the inviter and invitee are non-enterprise users | Insert row into collab_out | Insert row into collab_in |
| 6 | Create a collaboration where the inviter does not own the item | Insert row into collab_out with inviter_user_id set to the inviter | Insert row into collab_in |
| 7 | Create a group collaboration where the group members belong to the same enterprise | Insert row into collab_out | Insert row into collab_in |

TABLE 4

Example collaboration update use cases

| | | Database Operations | |
|---|---|---|---|
| Ref | Use Case | Inviter Partition | Invitee Partition |
| 1 | Update collaboration for invitation acceptance | Update row in collab_out | Update row in collab_in |
| 2 | Update collaboration for invitation seen | Update row in collab_out | None |
| 3 | Update collaboration for permissions (e.g., role) change | Update row(s) in collab_out | Update row(s) in collab_in |
| 4 | Update collaboration for inviter enterprise change | Same partition: update row(s) in collab_out; new partition: insert row(s) in collab_out | Update row(s) in collab_in for all collaborating with inviter |
| 5 | Update collaboration for invitee enterprise change | Update row(s) in collab_out for all collaborating with invitee | Same partition: update row(s) in collab_in; new partition: insert row(s) in collab_in |

TABLE 5

Example collaboration deletion use cases

| | | Database Operations | |
|---|---|---|---|
| Ref | Use Case | Inviter Partition | Invitee Partition |
| 1 | Delete accepted collaborations for a given item due to collaboration cancellation by user | Delete row(s) from collab_out | Delete row(s) from collab_in |
| 2 | Delete pending collaborations unaccepted after a time limit | Delete row(s) from collab_out | Delete row(s) from collab_in |
| 3 | A non-owner invitee is removed as a collaborator on an item | Delete row(s) from collab_out where user_id is the non-owner invitee | Delete row(s) from collab_in for the non-owner invitee |
| 4 | A shared item is deleted | Delete row(s) from collab_out by item_id | Delete row(s) from collab_in by item_id |
| 5 | A group in an enterprise is deleted | Delete row(s) from collab_out referencing the group | Delete row(s) from collab_in referencing the group |

Continuing, and referring to Ref. 3 of Table 5, the described use case highlights the concept of an owner being distinct from an invitee. This concept can be drawn to further include the concept of an owner being distinct from an inviter of the content that is being collaborated on. As depicted above, a collaborator who does not own the content can invite someone else to collaborate. In some embodiments, the outgoing collaboration attributes are stored on the owner's shard rather than on the inviter's shard (e.g., in the case where the owner and inviter differ).

Figure 6:
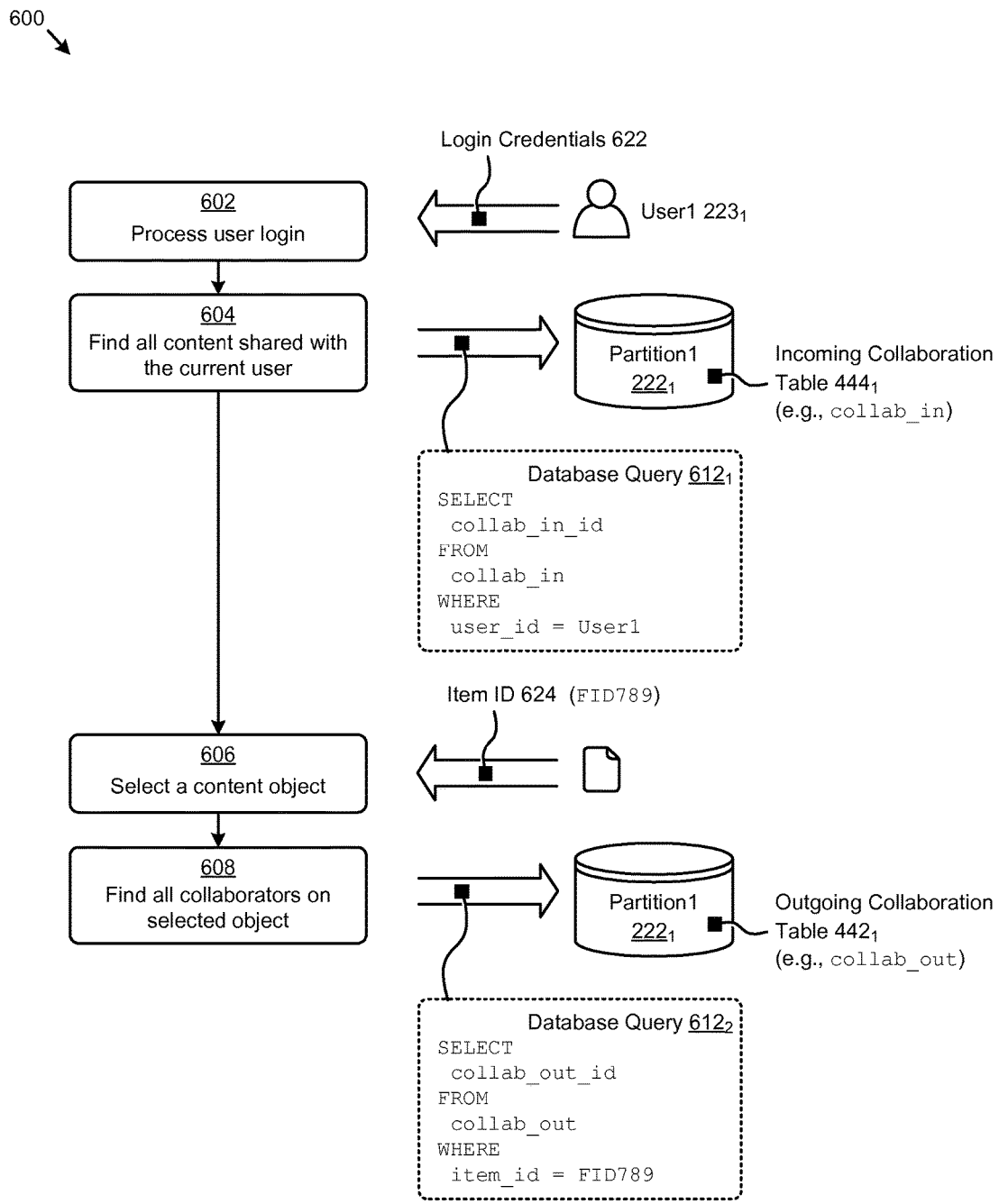
FIG. 6 is a diagram of a collaboration search technique as used in systems for accessing shared content using collaboration attribute partitioning, according to some embodiments.

FIG. 6 is a diagram of a collaboration search technique 600 as used in systems for accessing shared content using collaboration attribute partitioning. As an option, one or more variations of collaboration search technique 600 or any aspect thereof may be implemented in the context of the architecture and functionality of the embodiments described herein. Also, the collaboration search technique 600 or any aspect thereof may be implemented in any environment.

The collaboration search technique 600 presents one embodiment of certain steps for discovering certain combinations of collaborations established using the herein disclosed techniques for accessing shared content using collaboration attribute partitioning. In one or more embodiments the steps and underlying operations shown in the collaboration search technique 600 can be executed by a collaboration server in a cloud-based shared content management platform.

Specifically, the collaboration search technique 600 can commence with processing a user login (see step 602). For example, the user1 $223_1$ might log in to a web application (e.g., web application $203_1$) provided by the cloud-based shared content management platform to access content controlled by the user1 $223_1$ and/or content shared with the user1 $223_1$. Certain instances of login credentials 622 might be processed in response to the login for various purposes (e.g., user authentication, user authorization, access provisioning, etc.). In some cases, all the content shared with the current user (e.g., user1 $223_1$) can be discovered for presentation to the user's workspace (see step 604). For example, according to one or more embodiments, a database query $612_1$ can be issued on the incoming collaboration table $444_1$ (e.g., table collab_in) in the partition1 $222_1$. As shown, the database query $612_1$ can discover all the incoming collaborations associated with the user User1. Further, the user might select a content object from the workspace (see step 606), such as a file having an item ID 624 of FID789. In such cases, all of the collaborators associated with the selected object can be discovered (see step 608). For example, according to one or more embodiments, a database query $612_2$ can be issued on the outgoing collaboration table $442_1$ (e.g., table collab_out) in the partition1 $222_1$. As shown, the database query $612_2$ can discover all the outgoing collaborations associated with the file FID789.

The collaboration search technique 600 presents merely examples of queries of the data structures used to implement the herein disclosed techniques for accessing shared content using collaboration attribute partitioning. Other queries and/or operations are possible. Additional examples are shown in Table 6. For reference, an outgoing collaboration table is referred to as collab_out and an incoming collaboration table is referred to as collab_in. Other query terms may correspond to attributes types earlier described as pertains to FIG. 4.

TABLE 6

Example collaboration creation use cases

| Ref | Use Case | Comments | |
|---|---|---|---|
| 1 | Find all collaboration items shared with users in the same enterprise | SELECT<br>FROM<br>WHERE<br><br>AND | collab_out_id<br><br>collab_out<br><br>item_user_id = current_user_id<br>user_enterprise_id = current_user_enterprise_id |
| 2 | Find all collaboration items shared with external users in another enterprise | SELECT<br>FROM<br>WHERE<br><br>AND<br>AND | collab_out_id<br><br>collab_out<br><br>item_user_id = current_user_id<br>user_enterprise_id > 0<br>user_enterprise_id != item_user_enterprise_id |
| 3 | Find all collaboration items shared with external users with no enterprise | SELECT<br>FROM<br>WHERE<br><br>AND | collab_out_id<br><br>collab_out<br><br>item_user_id = current_user_id<br>user_enterprise_id = 0 |
| 4 | Find all collaboration items shared from current enterprise | SELECT<br>FROM<br>WHERE | collab_out_id<br><br>collab_out<br><br>item_enterprise_id = current_enterprise_id |

TABLE 6-continued

Example collaboration creation use cases

| Ref | Use Case | Comments | |
|---|---|---|---|
| 5 | Find all collaboration items shared from external users with no enterprise | SELECT<br>FROM<br>WHERE<br>AND | collab_in_id<br>collab_in<br><br>user_id = current_user_id<br>item_user_enterprise_id = 0 |
| 6 | Find all collaboration items shared from external users in an enterprise | SELECT<br>FROM<br>WHERE<br>AND<br>AND | collab_in_id<br>collab_in<br><br>user_id = current_user_id<br>item_user_enterprise_id >0<br>item_user_enterprise_id !=<br>current_user_enterprise_id |
| 7 | Find all external collaborators for a given enterprise (e.g., as issued by "admin" user) | SELECT<br>FROM<br>WHERE | collab_out_id<br>collab_out<br><br>user_enterprise_id !=<br>current_user_enterprise_id |

Additional Embodiments of the Disclosure

Additional Practical Application Examples

Figure 7:
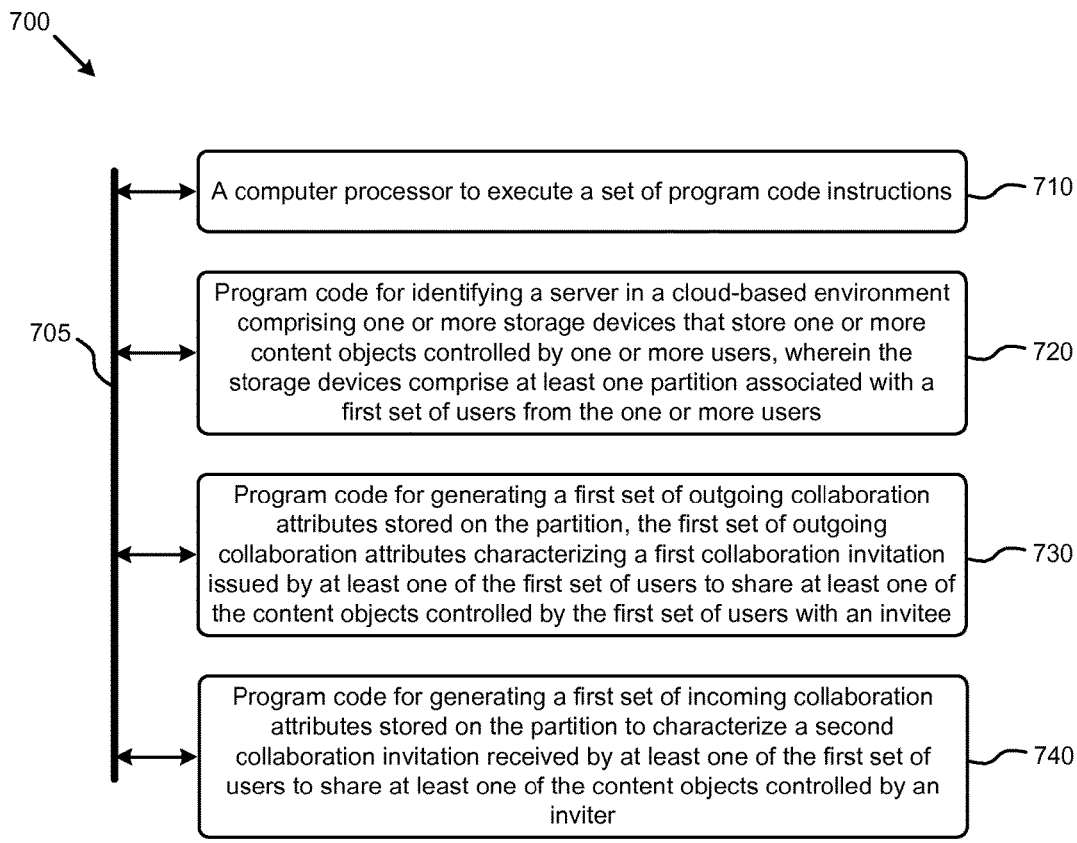
FIG. 7 depicts system components as arrangements of computing modules that are interconnected so as to operate cooperatively to implement certain of the herein-disclosed embodiments.

FIG. 7 depicts a system 700 as an arrangement of computing modules that are interconnected so as to operate cooperatively to implement certain of the herein-disclosed embodiments. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment.

The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims.

The shown embodiment implements a portion of a computer system, presented as system 700, comprising a computer processor to execute a set of program code instructions (see module 710) and modules for accessing memory to hold program code instructions to perform: identifying a server in a cloud-based environment comprising one or more storage devices that store one or more content objects controlled by one or more users, wherein the storage devices comprise at least one partition associated with a first set of users from the one or more users (see module 720); generating a first set of outgoing collaboration attributes stored on the partition, the first set of outgoing collaboration attributes characterizing a first collaboration invitation issued by at least one of the first set of users to share at least one of the content objects controlled by the first set of users with an invitee (see module 730); and generating a first set of incoming collaboration attributes stored on the partition to characterize a second collaboration invitation received by at least one of the first set of users to share at least one of the content objects controlled by an inviter (see module 740).

Various embodiments include variations. Strictly as examples, one embodiment further comprises generating a set of partition mapping attributes characterizing at least one of, a destination partition corresponding to the first set of outgoing collaboration attributes, or a source partition corresponding to the first set of incoming collaboration attributes. Another embodiment further comprises delivering a web application to facilitate at least one of, issuing the first collaboration invitation, or receiving the second collaboration invitation.

In some situations, the first set of outgoing collaboration attributes corresponds to a second set of incoming collaboration attributes associated with the invitee, or the first set of incoming collaboration attributes corresponds to a second set of outgoing collaboration attributes associated with the inviter. The first set of outgoing collaboration attributes and the first set of incoming collaboration attributes can be stored in at least one of, one database table, or a plurality of database tables.

In still other situations, the incoming collaboration attributes comprise a permissions identifier, a user identifier, an enterprise identifier, an item identifier, an item type identifier, or a collaboration identifier, and/or the inviter (or the invitee) comprises an individual user, a group of users, an enterprise, or a segment. Still more, a partition can store a set of content attributes, a set of group attributes, or a set of user attributes.

System Architecture Overview

Additional System Architecture Examples

Figure 8A:
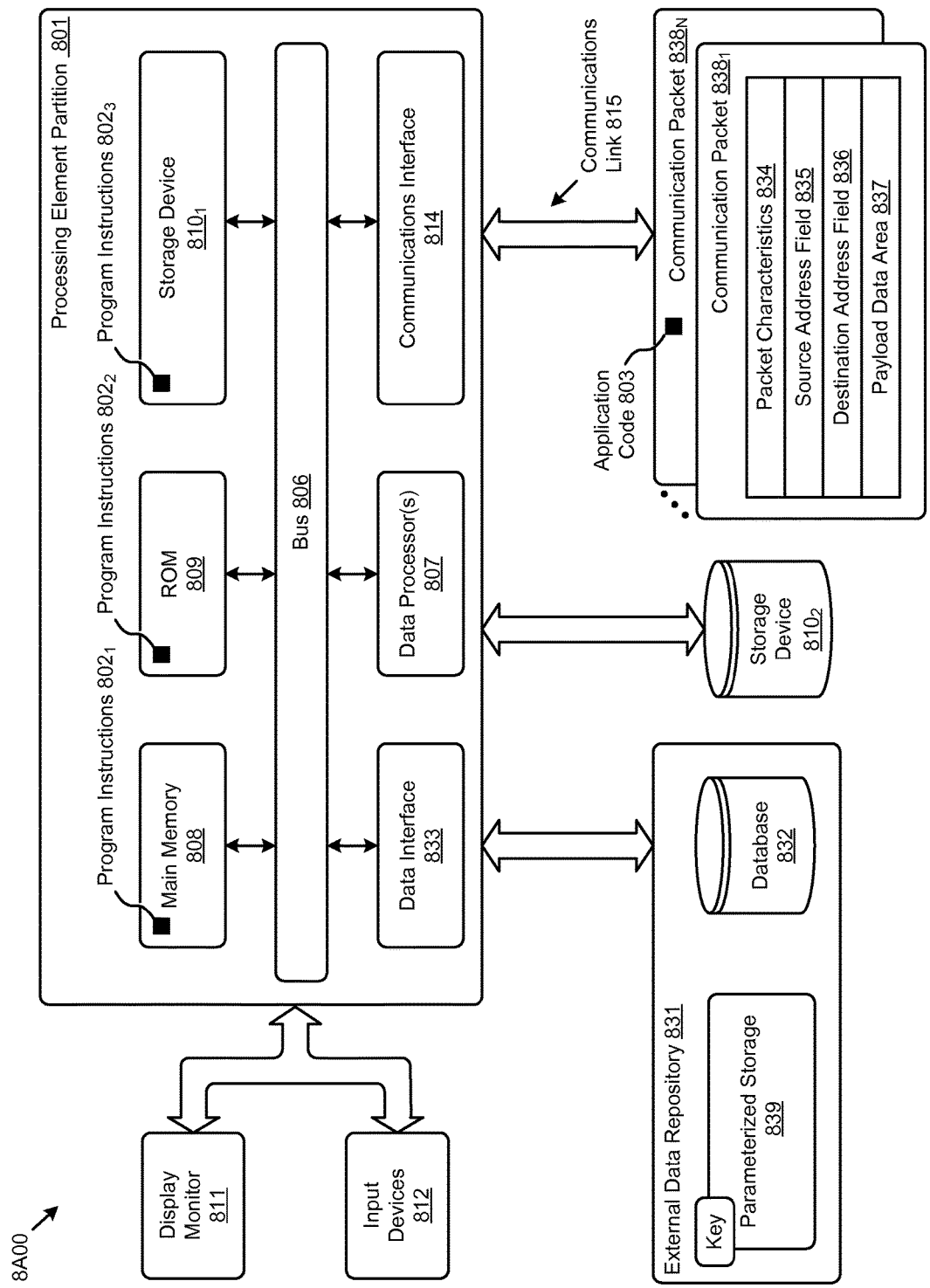
FIG. 8A and FIG. 8B depict exemplary architectures of components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a central processing unit (CPU), or a multi-core CPU (e.g., data processor 807), a system memory (e.g., main memory 808, or an area of random access memory (RAM)), a non-volatile storage device or non-volatile storage area (e.g., read-only memory 809), an internal storage device 810$_1$ or external storage device 810$_2$ (e.g., magnetic or optical), a data interface 833, a communications interface 814 (e.g., PHY, MAC, Ethernet interface, modem, etc.). The aforementioned components are shown within processing element partition 801, however other partitions are possible. The shown computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program code instructions contained in a memory. Such instructions (e.g., program instructions 802$_1$, program instructions 802$_2$, program instructions 802$_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of the communications interface 814 may comprise one or more networking ports that are configurable (e.g., pertaining to speed, protocol, physical layer characteristics, media access characteristics, etc.) and any particular instance of the communications interface 814 or port thereto can be configured differently from any other particular instance. Portions of a communication protocol can be carried out in whole or in part by any instance of the communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

The communications link 815 can be configured to transmit (e.g., send, receive, signal, etc.) any types of communications packets comprising any organization of data items. The data items can comprise a payload data area 837, a destination address 836 (e.g., a destination IP address), a source address 835 (e.g., a source IP address), and can include various encodings or formatting of bit fields to populate the shown packet characteristics 834. In some cases the packet characteristics include a version identifier, a packet or payload length, a traffic class, a flow label, etc. In some cases the payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of the computer system 8A00. According to certain embodiments of the disclosure, two or more instances of computer system 8A00 coupled by a communications link 815 (e.g., LAN, PTSN, or wireless network) may perform the sequence of instructions required to practice embodiments of the disclosure using two or more instances of components of computer system 8A00.

The computer system 8A00 may transmit and receive messages such as data and/or instructions organized into a data structure (e.g., communications packets 838$_1$ through communications packets 838$_N$). The data structure can include program instructions (e.g., application code 803), communicated through communications link 815 and communications interface 814. Received program code may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

The processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). A module may include one or more state machines and/or combinational logic used to implement or facilitate the operational and/or performance characteristics of techniques for accessing shared content using collaboration attribute partitioning.

Various implementations of the database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of accessing shared content using collaboration attribute partitioning). Such files or records can be brought into and/or stored in volatile or non-volatile memory.

Figure 8B:
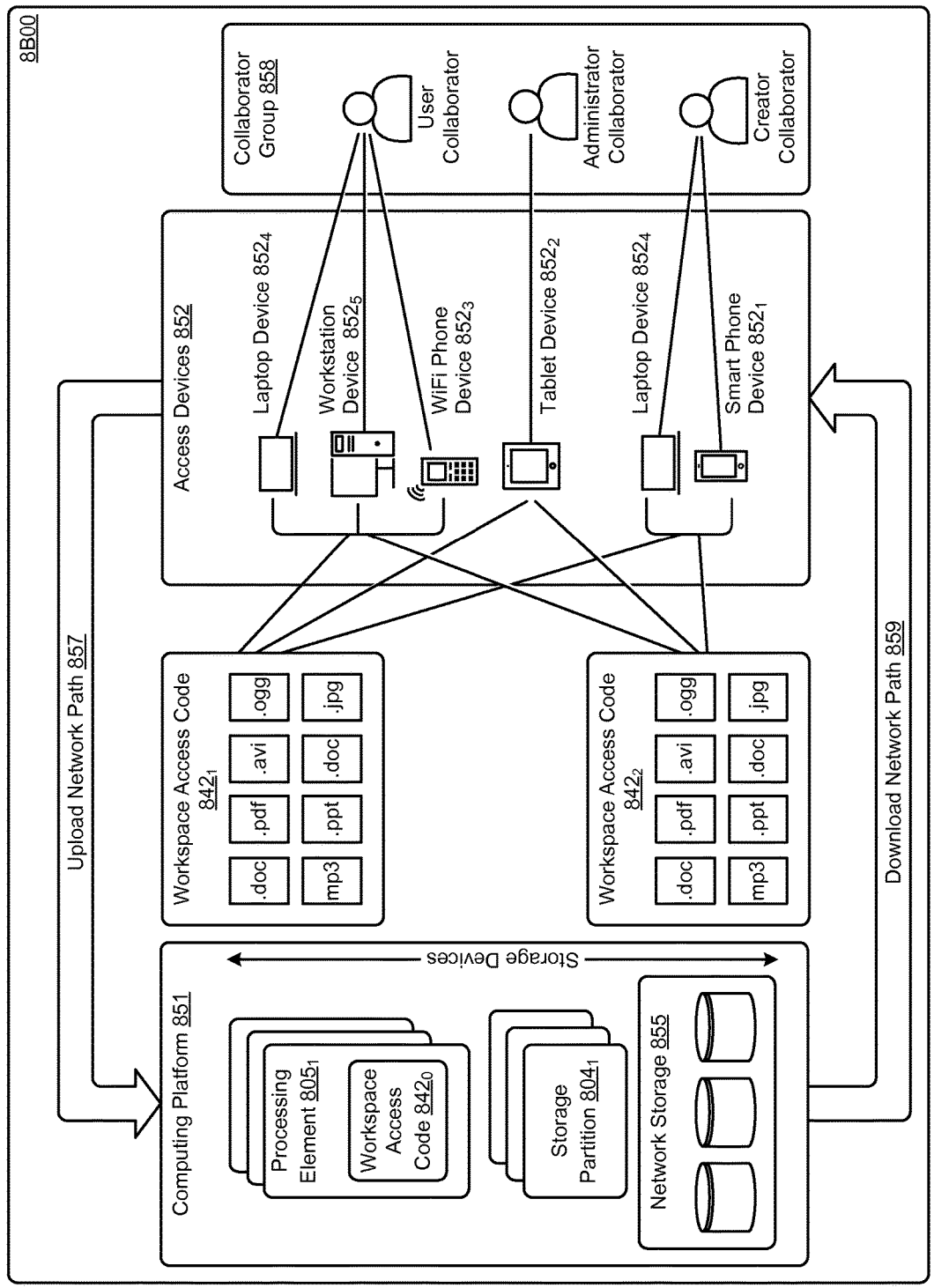

FIG. 8B depicts a block diagram of an instance of a cloud-based environment 8B00. Such a cloud-based environment supports access to workspaces through the execution of workspace access code (e.g., workspace access code $842_0$, workspace access code $842_1$, and workspace access code $842_2$) Workspace access code can be executed on any of the shown access devices 852 (e.g., laptop device $852_4$, workstation device $852_5$, WiFi phone device $852_3$, tablet device $852_2$, smart phone device $852_1$, etc.). A group of users can form a collaborator group 858, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Also, a portion of the workspace access code can reside in and be executed on any computing platform 851, including in a middleware setting. As shown, a portion of the workspace access code resides in and can be executed on one or more processing elements (e.g., processing element $805_1$). The workspace access code can interface with storage devices such the shown networked storage 855. Storage of workspaces and/or any constituent files or objects, and/or any other code or scripts or data can be stored in any one or more storage partitions (e.g., storage partition $804_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 857). A stored workspace can be delivered to a particular user and/or shared with other particular users via a download (e.g., a download from a processing element to an access device over a download network path 859).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
    identifying one or more storage devices that store one or more content objects, wherein the storage devices comprise at least a first partition associated with a first set of content objects and a second partition associated with a second set of content objects, wherein the first partition is assigned to a first set of users in a first location and the second partition is assigned to a second set of users in a second location, the second location being different from the first location;
    generating a first set of outgoing collaboration attributes pertaining to a shared content object from the first partition;
    storing, on the first partition, the first set of outgoing collaboration attributes that corresponds to a collaboration invitation issued by at least one of the first set of users to share the shared content object from the first partition in the first location with at least one of a second set of users in the second location;
    generating a set of incoming collaboration attributes stored in the second partition that corresponds to the collaboration invitation received by the at least one of the second set of users in the second location, wherein the set of incoming collaboration attributes that is stored in the second partition is derived from the first set of outgoing collaboration attributes in the first partition; and
    provisioning access to the shared content object from the first partition in the first location, wherein the shared content object in the first partition is shared to at least one of the second set of users in the second location according to both the set of incoming collaboration attributes local to the second partition and a set of partition mapping attributes, wherein the set of partition mapping attributes relate users to partitions.

2. The method of claim 1, further comprising delivering a web application to facilitate at least one of, issuing the outgoing collaboration attributes, or receiving the incoming collaboration attributes, or any combination thereto.

3. The method of claim 1, wherein the outgoing collaboration attributes corresponds to an inviter, and the incoming collaboration attributes corresponds with an invitee.

4. The method of claim 3, wherein at least one of, the inviter, or the invitee, comprises an individual user, a group of users, an enterprise, or a segment.

5. The method of claim 1, wherein the incoming collaboration attributes are stored in at least one of, a single database table, or a plurality of database tables.

6. The method of claim 5, wherein the single database table or the plurality of database tables comprise at least one of, a mutable field, or an immutable field.

7. The method of claim 1, wherein at least one of, the outgoing collaboration attributes, or the incoming collaboration attributes, comprises at least one of, a permissions identifier, a user identifier, an enterprise identifier, an item identifier, an item type identifier, or a collaboration identifier.

8. The method of claim 1, wherein the first partition further serves to store at least one of, a set of content attributes, a set of group attributes, or a set of user attributes, associated with the first set of users.

9. The method of claim 1, wherein a location of the second partition is determined by accessing a partition mapping table that relates users to partitions.

10. The method of claim 1, further comprising generating a second set of outgoing collaboration attributes pertaining to a shared content object from the first partition.

11. A computer program product, embodied in a non-transitory computer readable medium, the non-transitory computer readable medium having stored thereon a sequence of instructions which, when stored in memory and executed by a processor causes the processor to perform a set of acts, the acts comprising:

identifying one or more storage devices that store one or more content objects, wherein the storage devices comprise at least a first partition associated with a first set of content objects and a second partition associated with a second set of content objects, wherein the first partition is assigned to a first set of users in a first location and the second partition is assigned to a second set of users in a second location, the second location being different from the first location;

generating a first set of outgoing collaboration attributes pertaining to a shared content object from the first partition;

storing, on the first partition, the first set of outgoing collaboration attributes that corresponds to a collaboration invitation issued by at least one of the first set of users to share the shared content object from the first partition in the first location with at least one of a second set of users in the second location;

generating a set of incoming collaboration attributes stored in the second partition that corresponds to the collaboration invitation received by the at least one of the second set of users in the second location, wherein the set of incoming collaboration attributes that is stored in the second partition is derived from the first set of outgoing collaboration attributes in the first partition; and provisioning access to the shared content object from the first partition in the first location, wherein the shared content object in the first partition is shared to at least one of the second set of users in the second location according to both the set of incoming collaboration attributes local to the second partition and a set of partition mapping attributes, wherein the set of partition mapping attributes relate users to partitions.

12. The computer program product of claim 11, further comprising instructions which, when stored in memory and executed by a processor causes the processor to perform acts of delivering a web application to facilitate at least one of, issuing the outgoing collaboration attributes, or receiving the incoming collaboration attributes, or any combination thereto.

13. The computer program product of claim 11, wherein the outgoing collaboration attributes corresponds to an inviter, and the incoming collaboration attributes corresponds with an invitee.

14. The computer program product of claim 13, wherein at least one of, the inviter, or the invitee, comprises an individual user, a group of users, an enterprise, or a segment.

15. The computer program product of claim 11, wherein at least one of, the outgoing collaboration attributes, or the incoming collaboration attributes, comprises at least one of, a permissions identifier, a user identifier, an enterprise identifier, an item identifier, an item type identifier, or a collaboration identifier.

16. The computer program product of claim 11, wherein the first partition further serves to store at least one of, a set of content attributes, a set of group attributes, or a set of user attributes, associated with the first set of users.

17. The computer program product of claim 11, wherein a location of the second partition is determined by accessing a partition mapping table that relates users to partitions.

18. The computer program product of claim 11, further comprising instructions which, when stored in memory and executed by a processor causes the processor to perform acts of generating a second set of outgoing collaboration attributes pertaining to a shared content object from the first partition.

19. A system comprising:

a set of one or more storage devices that store one or more content objects, wherein the storage devices comprise at least a first partition associated with a first set of content objects and a second partition associated with a second set of content objects, wherein the first partition is assigned to a first set of users in a first location and the second partition is assigned to a second set of users in a second location, the second location being different from the first location; and one or more servers that perform acts of, generating a first set of outgoing collaboration attributes pertaining to a shared content object from the first partition;

storing, on the first partition, the first set of outgoing collaboration attributes that corresponds to a collaboration invitation issued by at least one of the first set of users to share the shared content object from the first partition in the first location with at least one of a second set of users in the second location;

generating a set of incoming collaboration attributes stored in the second partition that corresponds to the collaboration invitation received by the at least one of the second set of users in the second location, wherein the set of incoming collaboration attributes that is stored in the second partition is derived from the first set of outgoing collaboration attributes in the first partition; and provisioning access to the shared content object from the first partition in the first location, wherein the shared content object in the first partition is shared to at least one of the second set of users in the second location according to both the set of incoming collaboration attributes local to the second partition and a set of partition mapping attributes, wherein the set of partition mapping attributes relate users to partitions.

20. The system of claim 19, further comprising a network path to deliver a web application to facilitate at least one of, issuing the outgoing collaboration attributes, or receiving the incoming collaboration attributes, or any combination thereto.

* * * * *